United States Patent
Kandaswamy et al.

(10) Patent No.: US 10,992,540 B1
(45) Date of Patent: Apr. 27, 2021

(54) DETERMINING FORMAL MODELS USING WEIGHTING FACTORS FOR COMPUTING ELEMENTS IN MULTI-CLOUD ENVIRONMENTS

(71) Applicant: Cisco Technology, Inc., San Jose, CA (US)

(72) Inventors: Sridar Kandaswamy, San Jose, CA (US); Sebastian Jeuk, Munich (DE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/878,341

(22) Filed: May 19, 2020

(51) Int. Cl.
  *H04L 12/24* (2006.01)
  *H04L 29/08* (2006.01)

(52) U.S. Cl.
  CPC .......... *H04L 41/12* (2013.01); *H04L 41/0813* (2013.01); *H04L 41/0823* (2013.01); *H04L 41/0886* (2013.01); *H04L 41/142* (2013.01); *H04L 41/5051* (2013.01); *H04L 67/10* (2013.01)

(58) Field of Classification Search
  CPC ... H04L 29/08135–08288; H04L 41/08–0803; H04L 41/0813–0836; H04L 41/0876–0886; H04L 41/0893; H04L 41/12–16; H04L 41/5041–5054; H04L 67/10; H04L 67/1002–1036
  See application file for complete search history.

(56) References Cited

U.S. PATENT DOCUMENTS

| | | | |
|---|---|---|---|
| 8,005,879 B2 | 8/2011 | Bomhoevd et al. | |
| 10,171,383 B2 | 1/2019 | Johnston et al. | |
| 10,691,504 B2 * | 6/2020 | Liu | G06F 9/505 |
| 10,872,029 B1 * | 12/2020 | Bawcom | H04L 41/0886 |

(Continued)

FOREIGN PATENT DOCUMENTS

| CN | 102868733 | 1/2013 |
|---|---|---|
| CN | 107819662 | 3/2018 |

OTHER PUBLICATIONS

Antonescu, Alexandru et al, "Dynamic Topology Orchestration for Distributed Cloud-Based Applications", Dec. 2012, pp. 1-9.

*Primary Examiner* — Brendan Y Higa
(74) *Attorney, Agent, or Firm* — Lee & Hayes, P.C.

(57) ABSTRACT

Techniques for deploying, monitoring, and modifying network topologies operating across multi-domain environments using formal models and weighting factors assigned to computing elements in the network topologies. The weighting factors restrict or allow the movement of various computing elements and/or element groupings to prevent undesirable disruptions or outages in the network topologies. Generally, the weighting factors may be determined based on an amount of disruption experienced in the network topologies if the corresponding computing element or grouping was migrated. As the amount of disruption caused by modifying a particular computing element increases, the weighting factor represents a greater measure of resistivity for migrating the computing element. In this way, topology deployment systems may allow, or disallow, the modification of particular computing elements based on weighting (Continued)

factors. Thus, the amount of disruption in the functioning of network topologies may be considered when optimizing the allocation of computing elements across multi-domain environments.

20 Claims, 7 Drawing Sheets

(56) References Cited

U.S. PATENT DOCUMENTS

| | | | |
|---|---|---|---|
| 2015/0188989 A1* | 7/2015 | Chaliparambil | H04L 67/10 709/204 |
| 2016/0188355 A1* | 6/2016 | Cao | G06F 9/45558 718/1 |
| 2020/0259715 A1* | 8/2020 | Schermann | H04L 41/22 |

* cited by examiner

US 10,992,540 B1

DETERMINING FORMAL MODELS USING WEIGHTING FACTORS FOR COMPUTING ELEMENTS IN MULTI-CLOUD ENVIRONMENTS

TECHNICAL FIELD

The present disclosure relates generally to deploying and instantiating computing and/or network topologies across multiple cloud infrastructures (or "multi-cloud environments") using logical topology models. In particular, the present disclosure relates to receiving operational data from the network topology deployed across a multi-cloud environment, using the operational data to detect a change in the network topology, and updating the deployed network topologies based on the change detected in the network topology.

BACKGROUND

Cloud computing involves using a network of servers hosted remotely in data centers to store, manage, and process data, rather than a local server or a personal computer. Often, enterprises manage private cloud networks allocated exclusively for their personal computing needs, and may further utilize public cloud networks when their computing needs outgrow the infrastructure of the private cloud networks. In these multi-cloud networks, enterprises and/or other users may allocate the private clouds and/or on-premise infrastructures for storing or processing private and secure data, while one or more public clouds may be used for storing or process other non-secure system data. These multi-cloud computing environments may allow architectural flexibility and scalability with respect to processing demand, as well as allowing integration of specialized computational models.

When designing computing, storage, and network topologies within public cloud computing environments, cloud providers may use multiple deployment models that allow system administrators (e.g., users with one or more administration accounts) to select the particular services or applications to execute using public and/or private cloud resources, depending on the level of sensitivity of the data. However, multi-cloud networks may be complex and costly to deploy and maintain, due to the potential functional disparities between the different cloud environments, dynamic alterations that may be performed within individual cloud environments after deployment of the topology, and the splitting of system management responsibilities between the public cloud providers, private cloud providers, and on-premise infra structure administrators. Thus, there is a need for enhanced generation of deployment models in order to be compatible with multi-cloud networks.

Templates of deployment models for network topologies have been developed to help create cloud networks with consistent topology and simplistic and often uniform distribution of the functions across private and public clouds. However, computing needs of users and deployments of computing elements in a network topology change over time such that a deployment topology that may have been appropriate at deployment of a network topology may no longer be appropriate through the life of a network topology in a multi-cloud environment. Further, the modifications made to network topologies to optimize placement of computing elements may result in unwanted downtime or disruptions that are costly to the users of the multi-cloud environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
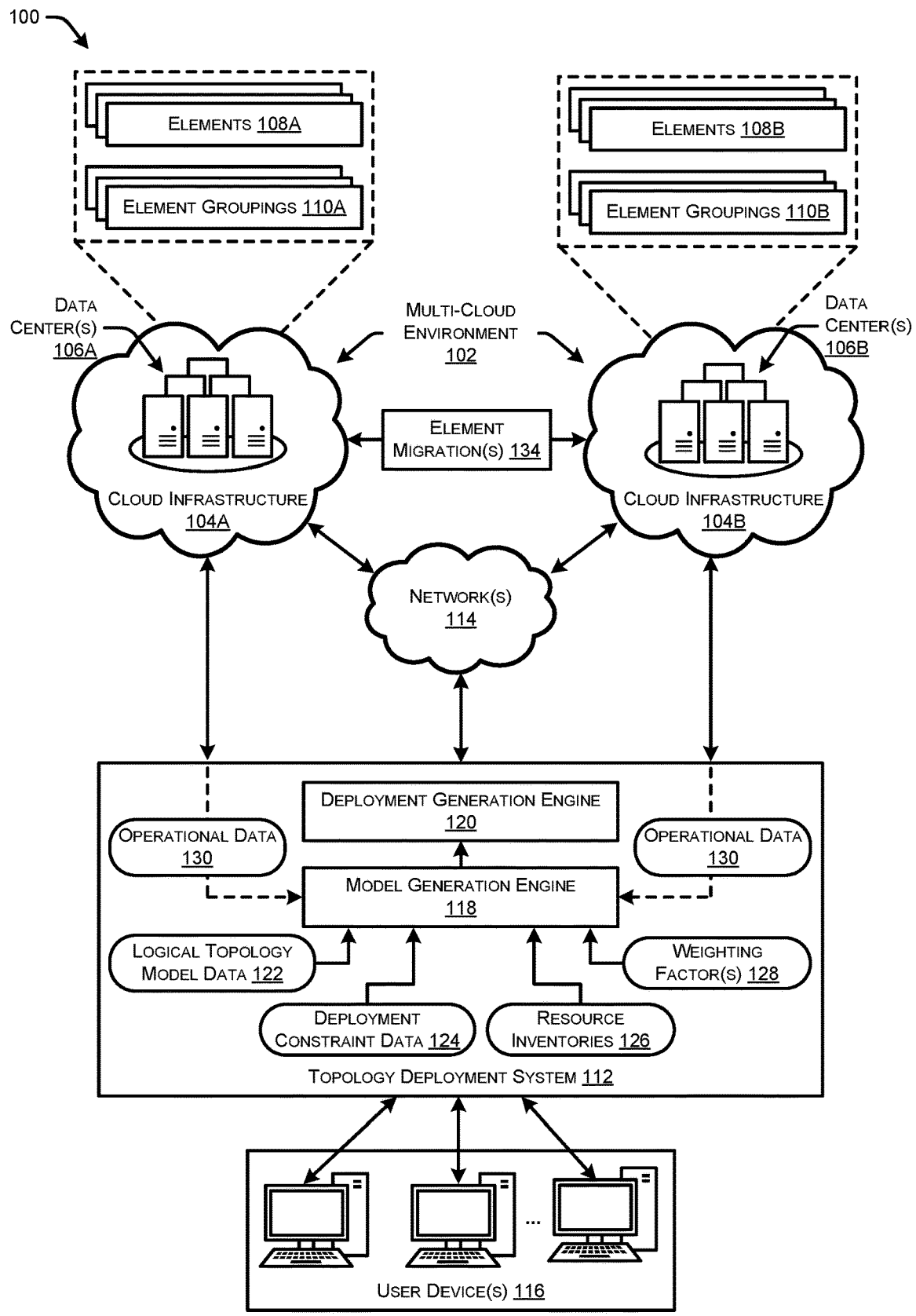
FIG. 1 illustrates a multi-cloud environment including multiple cloud environments/infrastructures to which a deployment system is configured to deploy network topologies, and modify the network topologies at least partly using weighting factors that correspond to a measure of resistivity of computing elements from being modified.

This disclosure describes techniques for deploying, monitoring, and modifying network topologies using formal models and weighting factors associated with computing elements of the network topologies that restrict or allow the modification of the computing elements based on an amount of disruption associated with migrating the computing elements. In accordance with certain embodiments, a topology deployment system may receive operational data associated with a network topology of computing elements. In some examples, the computing elements may be deployed across a multi-cloud environment, and the computing elements of the network topology have been deployed at least partly using a topology model. The topology deployment system may further determine a weighting factor for a particular computing element, of the computing elements, based at least in part on an amount of disruption associated with migrating the particular computing element in the multi-cloud environment. The topology deployment system may assign the weighting factor to the particular computing element, where the weighting factor corresponds to a measure of resistivity of the particular computing element from being migrated in the multi-cloud environment.

Further, the topology deployment system may receive inventory data indicating an inventory of available computing elements that are available in the multi-cloud environment, and may also receive constraint data that specifies one or more constraints upon deployment of the network topology of the computing elements across the multi-cloud environment. The topology deployment system may detect, using the operational data, a change associated with the network topology of the computing elements, and determine, based at least in part on the inventory data, the constraint data, the change, and the weighting factor, an updated topology model. Further, the topology deployment system may modify, based at least in part on the updated topology model, the network topology of the computing elements deployed in the multi-cloud environment.

The techniques described herein may be performed as methods, or by computing devices and/or system having processors and memory units, or may be embodied in non-transitory computer-readable medium storing processor-executable instructions that, when executed by one or more processors, performs the technique described.

Example Embodiments

This disclosure describes techniques for deploying, monitoring, and modifying network topologies operating across multi-cloud environments at least partly using weighting factors assigned to computing elements in the network topologies. Rather than simply migrating computing elements between different portions of the multi-cloud environment based on inventory of available resources and/or constraint policies, the weighting factors may restrict or allow the movement of various computing elements and/or computing element groupings to help prevent undesirable disruptions or outages in the network topologies. Generally, the weighting factors may be determined based on an amount of disruption that would be experienced in the network topologies if the corresponding computing element or computing element grouping was migrated or otherwise modified. As the amount of disruption caused by modifying a particular computing element and/or grouping increases, the weighting factor represents a greater measure of resistivity for migrating and/or modifying the computing element and/or grouping. In this way, topology deployment systems may allow, or disallow, the modification of particular computing elements and/or computing element groupings based on weighting factors that are assigned to the particular computing elements and/or computing element groupings. In this way, the cost of disrupting the functioning of network topologies may be taken into account when optimizing the allocation of computing elements in a network topology across multi-cloud environments.

Network topologies may refer to distributed computing systems in which a number of different computing elements (e.g., nodes, servers, network devices, etc.) are individually designed and/or configured to perform particular functionality, and the various computing elements may coordinate and communicate with other computing elements to provide to the overall functionality of the network topology. The various computing elements within a network topology may include, for example, computing elements (defined herein as including networking elements) that are specialized and dedicated as network nodes, computing nodes, storage nodes, operating systems, software applications and services, and/or virtual computing machines or instances, etc. Different types and configurations of computing elements may include specialized hardware and/or software components to perform the computing element functionality. Computing elements, for example, may include computing devices such as routers, servers, switches, load balancers, wireless access points, etc., running various software versions and/or having other attributes. Computing elements may include storage nodes, such as various types of dedicated storage systems, compute nodes, such as physical servers or other dedicated processing devices, and so on. Thus, network topologies may be used to implement enterprise systems and other large-scale computer systems.

In some embodiments, a network topology may be distributed across multiple different cloud infrastructures, (e.g., multiple isolated workload resource domains). A cloud infrastructure may refer to any computing resource network, environment, and/or domain, such as public cloud computing environment, a private cloud computing environment, an on-premise datacenter of an organization, etc. Such network topologies may be referred to as hybrid-cloud topologies and/or multi-cloud topologies, in which the topology uses or includes one or more computing elements distributed across multiple different cloud infrastructures, networks, environments, etc. Such multi-cloud topologies may provide potential advantages when designing and deploying large-scale computing systems. For example, certain network topologies may use deployment models in which private clouds and/or on-premise infrastructures are allocated to store and process private and secure data, while one or more public clouds may be used to store or process other non-secure system data. Multi-cloud network topologies also may allow for architectural flexibility and scalability with respect to changes in processing demand over time, as well as allowing integration of specialized computational models.

In accordance with certain embodiments described herein, a topology deployment system may deploy a network topology across a multi-cloud environment. In order to deploy the network topology, the topology deployment system may generate and validate logical topology models which optimize network functions and placement of computing elements within the multi-cloud environments. The logical topology models may generally represent the network topology that is to be deployed, and be used to generated deployment instructions for the various cloud infrastructures to deploy various computing elements in and across the multi-cloud environment.

In some examples, the topology deployment system may receive a logical deployment model that represents a current and/or prospective network topology of computing elements across a multi-cloud environment. The deployment model may be utilized to generate instructions that cause the multi-cloud environment to instantiate the underlying or represented network topology. For instance, the logical topology model may include or represent a set of deployment instructions that can be transmitted to one or more cloud infrastructures in the multi-cloud environment and cause the computing elements of the network topology to be instantiated or otherwise deployed.

In addition to receiving the logical topology model, the topology deployment system may receive inventory data indicating an inventory of available computing elements that are available in the multi-cloud environment, and may also receive constraint data that specifies one or more constraints upon deployment of the network topology of the computing elements across the multi-cloud environment. The topology deployment system may optimize the placement of the computing elements based at least in part on the inventory data and the constraint data such that the placement of computing elements of the network topology abide by the constraints and optimize usage of the available computing elements. The topology deployment system may generate a formal topology model using the logical topology model input, the inventory data, and the constraint data, where the formal topology model represents a set of instructions for deploying the final network topology of computing elements across the multi-cloud environment.

After the topology deployment system deploys the network topology of computing elements across the multi-cloud environment, the topology deployment system may monitor the network topology to detect changes in the network topology. Such topology changes may include any change that can impact the network topology of network functions, such as change in capacity for computing element(s), migrating of computing element(s), deployment/instantiation of new computing element(s), removal of computing element(s), and so forth. In some examples, factors outside of the network topology result in changes in the multi-cloud environment outside the network topology of interest. For instance, the multi-cloud environment may see an overall uptick in usage which may change the availability, cost, etc., of computing elements of the network topology. Upon detecting one or more changes in the network topology, the topology deployment system may determine whether the network topology needs to be adjusted due to the change to optimize the placement of computing elements.

Generally, a change in a network topology may cause the topology deployment system to re-evaluate the network topology using the constraint data, inventory data, and/or logical topology models. Often, the topology deployment system may determine that computing elements should be migrated to different locations in the multi-cloud environment to optimize the placement of computing elements in the multi-cloud environment. As an example, a private cloud infrastructure may have additional capacity due to change in demand from users, and the inventory of available resources in the private cloud infrastructure may increase. Due to this increase, the topology deployment system may determine that one or more computing elements are to be migrated from a public cloud infrastructure to the private cloud infrastructure for various optimizations, such as decreases in latency and cost.

However, in some examples, the topology deployment system may assign weighting factors to individual computing elements, and/or groupings of computing elements, to restrict or allow the movement of computing elements in the network topology. Generally, the weighting factors may be assigned to computing elements based on an amount of disruption associated with migrating the respective computing element(s). The amount of disruption may correspond to a dynamic and/or static state of the computing element. For instance, computing elements that are performing high-priority computations, are servicing large number of traffic flows, have high resource utilization rates, etc., may be assigned weighting factors that restrict movement of those computing elements. In such examples, the amount of disruption caused from migrating the computing elements may be high enough to warrant assigning weighting factors that provide the computing elements with higher measures of resistivity to moving/migrating of the computing elements in the multi-cloud environment. Conversely, computing elements that are servicing few flows, have low resource utilization rates, etc., may have weighting factors assigned to them that encourage or allow migrating of the computing elements to different locations in the multi-cloud environment.

The topology deployment system may take into account the weighting factors in addition to the inventory data and/or constraint data when updating the formal topology model. The topology deployment system may determine which computing elements are to be migrated and/or otherwise modified based on optimization of available resources, permissions under the constraints, and the resistivity to movement/change indicated by the weighting factors. The topology deployment system may modify the formal topology model and use the formal topology model to modify the network topology across the various clouds of the multi-cloud infrastructure.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 representing a multi-cloud environment 102 including multiple cloud environments/infrastructures 104A and 104B to which a deployment system is configured to deploy network topologies, and modify the network topologies at least partly using weighting factors that correspond to a measure of resistivity of computing elements from being modified.

As noted above, the multi-cloud environment 102 (often referred to as hybrid network/cloud architecture) generally refers to large-scale computing systems and/or solutions that are implemented by several different computing elements of various different types (e.g., network nodes, storage nodes, compute nodes, software application or service nodes, virtual machines or instances, etc.), which are deployed across multiple different cloud infrastructures or workload resource domains, and which interact and communicate to provide the functionality of the overall topology. The cloud infrastructures 104A and 104B may each refer to a dedicated pool of computer resources from which computing elements may be allocated. In this example, cloud infrastructure 104A may correspond to a first public cloud computing environment, and cloud infrastructures 104B may correspond to a second public cloud computing environment or to a separate private cloud computing environment or to an on-premise datacenter, and so on. Although only two cloud infrastructures 104A and 104B are shown in this example, it should be understood that a network topology may be deployed across any type of multi-cloud environment 102 including any number of different public clouds, public clouds, private clouds, on-premise datacenters, and/or other resource pools, in various embodiments.

Although the techniques of this disclosure are described with respect to cloud computing, the techniques are equally applicable to any type of multi-domain environment. A domain may generally be a resource pool consisting of compute, network, and/or storage elements. A domain may be private (such as owned and/or operated by an enterprise or private entity for their own use), public (e.g., a public cloud provider), and/or a multi-/hybrid-domain. The resource pool of each domain infrastructure in the multi-domain environment may comprise a data center, multiple data centers within the same enterprise, multiple data centers across enterprises, etc. As a specific example, a campus network of a school may be a type of domain infrastructure 104A that is connected to a data center running in another domain infrastructure 104B by a connection through a network 114, such as the Internet. Both of these domains 104A and 104B may further be connected to a public cloud provider 104C as a third domain. This is one example of the types of domain infrastructures 104 that may be interconnected to create a multi-domain environment 102. Thus, a domain infrastructure 104 may comprise a set of resources that are managed, operated, and/or owned by the same or by different entities. In one specific example, the multi-domain environment 102 may comprise a multi-cloud environment that includes multiple public clouds, multiple private clouds (e.g., enterprise networks), a public cloud in combination with a private cloud/network, etc. However, the multi-domain environment 102 may also be utilized in other technologies. For instance, the multi-domain environment 102 may comprise domains of different devices in an Internet-of-Things (IoT) environments where each domain is a different grouping of IoT devices, and the domains are interconnected to form the multi-domain environment. 102. Generally, the multi-domain environment 102 may comprise groupings of devices in different technology areas and/or different types of devices assigned to multiple domains that are connected to each other.

Generally, each cloud infrastructure 104A and 104B may comprise one or more respective data centers 106A and 106B. The data centers 106A and 106B may comprise any type of building with dedicated space that house or host hardware-based and/or software-based computing elements 108A and 108B, respectively. The data centers 106A may be interconnected with each other using a communication network, and the data centers 106B may be interconnected with each other using a different communication network. The different types of computing elements 108A and 108B and/or element groupings 110A and 110B (also referred to herein as "grouping of computing elements") that operate in the multi-cloud environment 102 may include various hardware elements (e.g., gateways, routers, network bridges, modems, wireless access points, switches, hubs, servers, repeaters, computing devices, etc.), and/or various software elements (e.g., operating systems, applications, processes, functions, virtual machines, containers, etc.). The elements 108 and/or element groupings 110 may perform any type of function individually, and/or in conjunction with other elements 108 and/or groupings 110 in the multi-cloud environment 102.

In some embodiments, a topology deployment system 112 may be coupled directly or indirectly to the multi-cloud environment 102 using one or more networks 114, including any combination of the Internet, Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof wired and/or wireless networks. The topology deployment system 112 may include components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments.

The topology deployment system 112 may include a model generation engine 118 configured to determine an updated topology model for a network deployment based on logical topology model data 122, deployment constraint data 124, resource inventories 126, and weighting factors 128 for the elements 108 and/or element groupings 110. The model generation engine 118 may provide the updated topology model for the network deployment to a deployment generation engine 120, which may include various subcomponents configured to verify and optimize the network topology, as well deployment-generation instructions programmed or configured to deploy and/or modify the network topology across the multi-cloud environment 102.

The logical topology model data 122 may generally specify or represent a logical topology of computing elements 108 and/or element groupings 110 that are deployed, or are to be deployed, across the multi-cloud environment 102. In some instances, individual logical topology models 122 may correspond to different types of services or applications, such as a logical topology model 122 representing a network topology for a user-facing website application, and a logical topology model 122 representing a network topology for backend processing applications (e.g., payment processing application(s)).

The deployment constraint data 124 represent constraints on what is permitted or allowed for physical deployment (or "physical realization" as used herein) of a formal topology model across the multi-cloud environment 102, and may vary in different examples. For example, constraints represented in the deployment constraint data 124 can include limits on the number of virtual machine instances that can be instantiated, limits on pricing or cost for computing elements 108, limits on minimum amounts of storage, restrictions on portions of the multi-cloud environment 102 that are permitted to store and/or process private data, etc.

The resource inventories 126 may generally represent the types and amounts of computing elements 108 or resources that are available in each of the cloud infrastructures 104, potentially along with other data (e.g., cost of using the computing elements 108, time required to deploy the computing elements 108, etc.).

The weighting factors 128 may be associated with elements 108 and/or element groupings 110, such as assigned to or tagged to, and generally represent a measure of resistivity of the elements 108 and/or groupings 110 from being migrated or otherwise modified in the network topology. As described further with reference to FIGS. 2 and 3, the weighting factors 128 may be determined based on an amount of disruption caused in the network topology (e.g., outages, latency, performance issues, downtime, etc.) by modifying the corresponding elements 108 and/or groupings 110. The weighting factors 128 may indicate or correspond to a current build state for the elements 108 and/or element groupings 110, and indicate an affinity for maintaining a relationship between the elements 108 and/or groupings 110 and the current host or region in the multi-cloud environment 102.

In some examples, one or more of the logical topology model data 122, deployment constraint data 124, and/or weighting factors 128 may be received from one or more user devices 116 that are associated with the network topology. For instance, various users, such as administrators, may provide the various input data noted above to help manage the network topology deployed across the multi-cloud environment 102.

The model generation engine 118 may receive this data and generate an updated formal topology model that is provided to the deployment generation engine 120. The deployment generation engine 120 may utilize the updated formal topology model to determine or generate a set of deployment instructions for modifying at least one computing element 108 of the network topology spanning across the multi-cloud environment 102. The deployment generation engine 120 may use deployment instructions to modify the network topology, and the instructions may be executable program instructions and may comprise machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions.

In this way, the deployment generation engine 120 may modify the network topology based on the updated formal topology model determined by the model generation engine 118 using the logical topology model data 122, deployment constraint data 124, resource inventories 126, and/or weighting factors 128. In some examples, the deployment generation engine 120 may cause various modifications to the network topology, such as element migrations 134 among the cloud infrastructures 104A and 104B.

In some examples, to detect the change in the network topology to determine the updated formal topology model, the model generation engine 118 may collect operations data 130 from one or more of the cloud infrastructures 104. The operational data 130 may be transmitted directly from the individual computing elements of the topology (e.g., network nodes, compute nodes, storage nodes, containers, software applications or services, virtual machine instances, etc.). Additionally, or alternatively, operational data 130 of the network topology may be collected indirectly and transmitted by monitoring devices or systems of the cloud infrastructures 104A and 104B (e.g., network monitors, performance monitors, administrative systems, etc.). The operational data 130 may be transmitted through the gateways and/or other edge computing devices of the cloud infrastructures 104A and 104B, to the topology deployment system 112, continuously, on a periodic basis (e.g., every second, every 10 seconds, every minute, every hour, etc.) and/or when triggered by specific events (e.g., performance thresholds, software or system errors, support ticket creation, etc.), and may be different for different sources of the operational data 130.

The operational data 130 may generally correspond to data collected after an initial deployment of the network topology within the cloud infrastructures 104A and 104B, and during time periods concurrent with the execution/operation of the various computing elements of the topology, so that the operational data may provide practical status and system feedback data, and may take into account dynamic updates occurring at the computing elements or elsewhere within the cloud infrastructures 104A and 104B which could not be predicted during the initial model generation process for the topology. The specific types of operational data 130, and frequencies at which the data is transmitted, may depend on the particular types, functionalities, and configurations of the computing elements 108 and/or groupings 110 within the topology. For instance, compute nodes may provide one set of operational data, network nodes may provide a different set of operational data, software services and virtual machine instances may provide still different sets of operational data, and so on. Specific (non-limiting) examples of operational data 130 may include, resource utilization data for computing elements within the topology, bandwidth utilization data for computing elements and/or for networks connecting other nodes/sections of the topology, software updates (including service level agreement changes) made to software applications or services executing within the topology, monetary costs associated with resources provided by external cloud infrastructures 104 (e.g., public or private clouds) including any changes to the costs/fee structures of the external cloud infrastructures 104A and 104B. Additionally, any of these operational data 130 may be specific to individual computing elements 108 of the deployed topology, to the individual cloud infrastructures 104, or to the topology as a whole. In some embodiments, similar or identical operational data 130 may be received from computing elements 108 and/or subnetworks that are not included within the deployed network topology, as operational changes within these other computing elements or subnetworks may indirectly affect the performance, stability, or scalability of the deployed topology.

Although not shown in FIG. 1 so as not to obscure the elements depicted therein, the multi-cloud environment 102 (which also may be referred to as a multi-cloud network, or a multi-resource pool network, etc.) may include any combination of one or more data communication networks through which the workload resource domains may communicate. Such data communication networks may include local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. Workload resource domains (e.g., private cloud network(s), public cloud network(s), on-premise datacenter(s), etc.), as well as topology deployment systems 112 and other elements of the environment 100 may each comprise a compatible interface and may be programmed or configured to use standardized protocols for communication across the networks such as TCP/IP, Bluetooth, and higher-layer protocols such as HTTP, TLS, and the like.

Each cloud infrastructure 104 may be implemented using a server-class computer or other computers having one or more processor cores, co-processors, or other computers. Cloud infrastructures 104 may include physical server computers and/or a virtual server instances stored in a datacenter, such as through cloud computing. Additionally, or alternatively, cloud infrastructures 104 such as public and/or private cloud networks, may comprise one or more applications executing on a server computer system which comprises instructions for application modeling and appliance/hardware mapping. Cloud infrastructures 104 may further comprise one or more network policies using notions such as templates or profiles that can be applied to different points in the multi-cloud environment 102.

In some embodiments, the topology deployment system 112 may be distributed across one or more of the cloud infrastructures 104, which may be bridged by a cloud service configured to integrate and virtualize various hierarchical layers of different public or private cloud networks, on-premise datacenters, etc. The individual cloud infrastructures 104 may comprise respective gateways (e.g., cloud gateways) that may translate cloud storage Application Programming Interfaces (APIs) to block-based storage protocols by using standard network protocols which integrate with existing applications within multi-cloud environment 102.

As noted above, in some embodiments operational feedback data 130 may be received from a network topology deployed across multiple cloud infrastructures 104. However, before any operational data 130 may be received, the network topology may be initially determined and deployed within the multi-cloud environment 102. Such deployment of network topologies across multiple cloud infrastructures 104 may being by receiving logical model input describing a prospective network topology and/or one or more predefined constraints to be placed on the formal/physical model. In some embodiments, the logical model input 122 and/or the constraints 124 may be received from a tenant user or system administrator via a user device 116. The topology deployment system 112 then may automatically generate a physical network topology (or physical realization) for the multi-cloud deployment, including transmitting sets of deployment instructions from the deployment generation engine 120 to gateways within the different cloud infrastructures 104. In some embodiments, the physical network topology determined within the model generation engine 118 may be subjected to formal model checking to determine whether it is functionally equivalent to the logical model input. Upon establishing functional equivalence between the logical model input and the physical topology that was generated, the deployment instructions may be considered verified, and an actual realization of the generated hybrid network topology may be initiated.

In some embodiments, the input received from the user device 116 describing the prospective network topology may account for multiple cloud infrastructures 104, including at least one public cloud network associated with a public cloud network provider, and at least one private cloud network associated with an enterprise. The enterprise may include programs, service models, and applications which reside in an on-premise datacenter of the enterprise. Such programs, service models, and applications may include software-as-a-service (SaaS) programs, platform-as-a-service (PaaS) programs, infrastructure-as-a-service (IaaS) programs, Load Balancing-as-a-service (LBaaS) programs, application frontends, application backends, application classification programs, firewalls or others.

A partial order reduction model checking also may be used by the model generation engine 118 for model verification in some embodiments. In some examples, the constraint inputs received from network tenants, administrators, etc., via user devices 116 may specify one or more constraints upon the realization of the logical topology within individual private cloud computing infrastructures and/or individual public cloud computing infrastructures within the hybrid network environment. In such cases, the model generation engine 118 may optimize the intermediate topology based upon the constraint input, including automatically remapping the intermediate topology to an optimized network topology by moving functional elements (e.g., computing elements or groups of computing elements) from a first cloud infrastructure 104 (e.g., a public cloud) in the intermediate topology, into a second cloud infrastructure 104 (e.g., a private cloud or on-premise datacenter) in the final formal network topology. In some cases, constraint inputs may specify one or more attributes of a private cloud infrastructure or public cloud infrastructure.

Although the multi-cloud environment 102 may be considered a single computer network, as may each individual cloud infrastructure 104 within the environment 100. As noted above, each of the infrastructures 104 may include a number of network devices configured for intra- and inter-network communications. Such network devices may include any type of networking device, such as servers, switches, routers, hubs, bridges, gateways, modems, repeaters, access points, etc. Additionally, these network devices may include personal, user devices such as phones, tablets, wearables devices, or other personal computing devices. The computing elements 108 may comprise physical nodes (e.g., processors, chipsets, devices, etc.), virtual nodes (virtual machines, containers, etc.), and/or any combination thereof.

Individual cloud infrastructures 104 may, in some cases, correspond to data centers operating in one or more physical locations. Such data centers (or other physical locations) may be physical facilities or buildings located across geographic areas that designated to store networked devices that are part of the corresponding cloud infrastructure 104. These data centers also may include various networking devices, as well as redundant or backup components and infrastructure for power supply, data communications connections, environmental controls, and various security devices. In some examples, a cloud infrastructure 104 may include one or more virtual data centers which are a pool or collection of cloud infrastructure resources specifically designed for enterprise needs, and/or for cloud-based service provider needs. Generally, the cloud infrastructures 104 (physical and/or virtual) may provide basic resources such as processor (CPU), memory (RAM), storage (disk), and networking (bandwidth). However, in some examples the network devices of the cloud infrastructure 104 might not be located in explicitly defined data centers, but may operate from other physical locations.

The user devices 116 through which the topology deployment system 112 may be controlled, may comprise any type of computing device through which a user is able to interact with other devices (e.g., phones, tablets, personal computing devices, wearable devices, network devices, etc.). In some examples, users of the user devices 116 may have registered accounts with the topology deployment system 112 in order to generate models, create and modify topologies, and deploy topologies within the cloud infrastructures 104. For instance, a topology design tool, constraint input tool, and/or optimization or recommendation tools may be provided by the topology deployment system 112 and accessible to authorized users at user devices 116 via a client portal (e.g., command line interface (CLI), application programming interface (API), web-based portal, etc.) and/or user interfaces. The user devices 116 may operate within and communicate with the topology deployment system 112 (and/or any other devices in the environment 100) over one or more networks, including any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

As described herein, the topology deployment system 112 may include one or more computing devices (e.g., a single device, multiple devices, network(s) of devices, etc.) comprising one or more processors configured to execute various computer-executable instructions. Additionally, topology deployment system 112 may include components, modules, etc., that are stored on non-transitory computer-readable media and configured to perform the techniques and operations described herein as being performed by the topology deployment system 112. For instance, the topology deployment system 112 may include the the model generation engine 118, the deployment generation engine 120, and/or any other number or arrangement of components. The components described herein are merely illustrative, and any number or configuration of components may be utilized to perform the techniques described herein.

Figure 2:
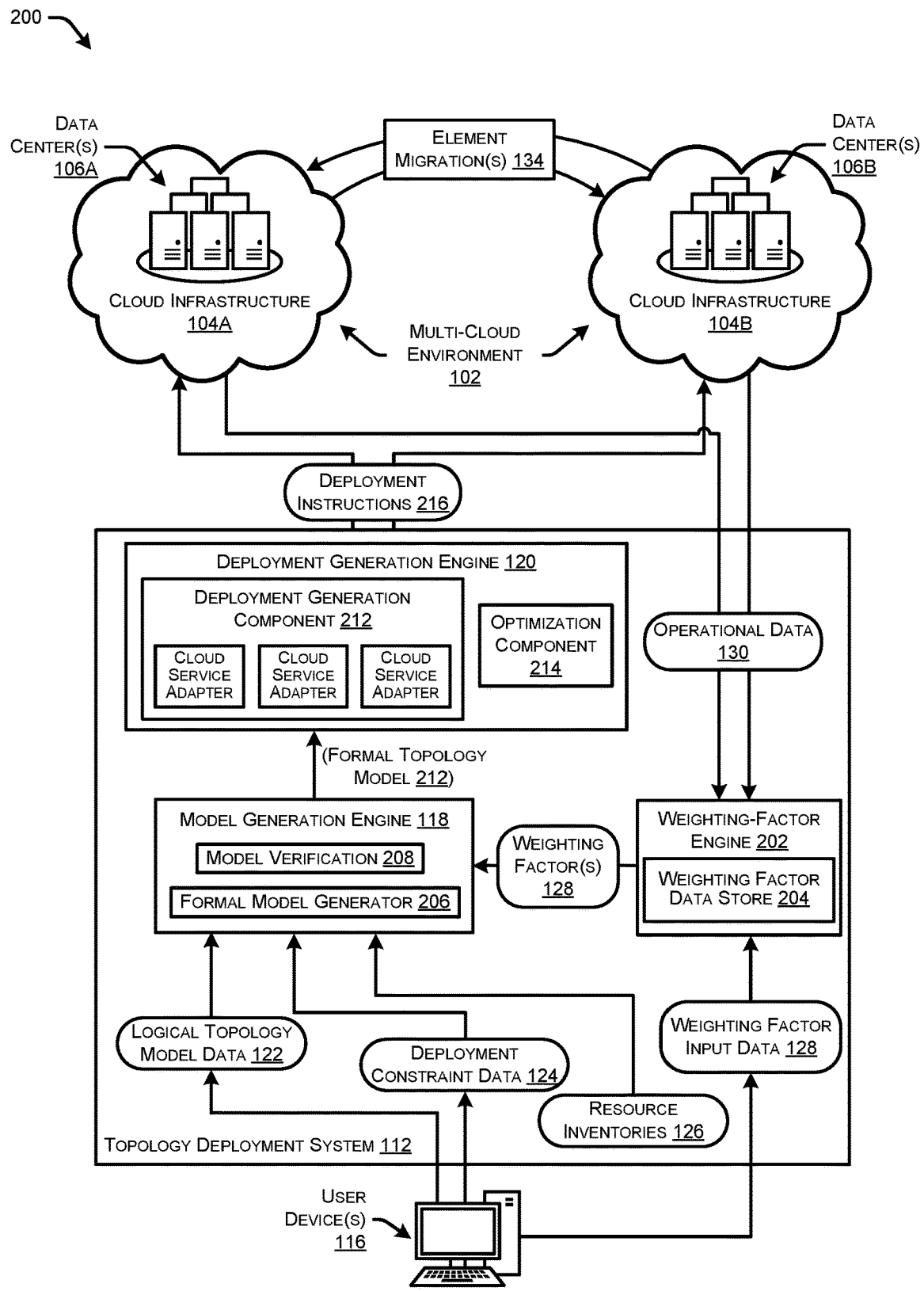
FIG. 2 illustrates a system diagram of an example topology deployment system configured to modify a network topology based at least in part on a logical topology model, deployment constraints, resource inventories of a multi-cloud environment, and weighting factors associated with computing elements.

FIG. 2 illustrates a system diagram 200 of an example topology deployment system 112 configured to modify a network topology based at least in part on a logical topology model 122, deployment constraints 124, resource inventories 126 of a multi-cloud environment 102, and weighting factors 128 associated with computing elements 108 and/or element groupings 110.

The computing environment 200 illustrated in this example may be similar or identical the computing environment 100 discussed above in reference to FIG. 1. Thus, computing environment 200 includes a topology deployment system 112, multiple cloud infrastructures 104 (e.g., one or more public clouds, private clouds, on-premise datacenters, and/or other resource pools), and a user device 116 through which authorized users (e.g., topology tenants, clients, administrators, etc.) may provide inputs to and may interact with the tools and user interfaces of the topology deployment system 112. Thus, this example may illustrate certain embodiments of the computing environment 100 described in FIG. 1, and in particular, certain features and embodiments of the model generation engine 118, and deployment generation engine 120.

As illustrated, the topology deployment system 112 may further include a weighting-factor engine 202 configured to determine the weighting factors 128 for the elements 108 and/or element groupings 110. For example, the weighting-factor engine 202 may receive weighting factor input data 128 from a user device 116 indicating a weighting factor 128 defined for an element 108 and/or grouping of elements 110. In some instances, the weighting-factor engine 202 may determine weighting factors 128 for elements 108 and/or groupings 110 based on element types. For instance, a load balancer element 108 may have a higher weighting factor 128 than a container element 108 indicating that modifying the load balancer element 108 would cause a larger disruption than migrating a container element 108. Thus, the weighting factors 128 may be static weighting factors 128 based on element type. As another example, the weighting-factor engine 202 may determine weighting factors 128 based on operational data 130 indicating resource usage by elements 108 in the cloud infrastructures 104A and/or 104B. For instance, elements 108 with high amounts of traffic flows may have higher weighting factors compared to elements 108 with lesser amounts of traffic flows. As another example, elements 108 that have higher resource utilization rates (e.g., CPU utilization rates, GPU utilization rates, memory utilization rates, storage utilization rates, etc.). The weighting-factor engine 202 may determine weighting factors 128 and store the factors in a weighting factor data store 204 for future use when re-evaluating formal topology models based on detected changes in the network topology.

As noted above, the model generation engine 118 may determine to re-evaluate the network topology based on detecting a change in the network topology in operational data 130. The operational data 130 may generally correspond to data collected after an initial deployment of the network topology within the multi-cloud environment 102, and during time periods concurrent with the execution/operation of the various computing elements 108 of the topology, so that the operational data 130 may provide practical status and system feedback data, and may take into account dynamic updates occurring at the computing elements 108 or elsewhere within the multi-cloud environment 102 which could not be predicted during the initial model generation process for the initial topology. The specific types of operational data 130, and frequencies at which the data is transmitted, may depend on the particular types, functionalities, and configurations of the computing elements within the topology. For instance, compute nodes may provide one set of operational data, network nodes may provide a different set of operational data, software services and virtual machine instances may provide still different sets of operational data, and so on. Specific (non-limiting) examples of operational data may include, resource utilization data for computing elements within the topology, bandwidth utilization data for computing elements and/or for networks connecting other nodes/sections of the topology, software updates (including service level agreement changes) made to software applications or services executing within the topology, monetary costs associated with resources provided by external cloud infrastructures 104 (e.g., public or private clouds) including any changes to the costs/fee structures of the external cloud infrastructures 104. Additionally, any of these operational data 130 may be specific to individual computing elements of the deployed topology, to the individual cloud infrastructures 104, or to the topology as a whole. In some embodiments, similar or identical operational data 130 may be received from computing elements 108 and/or subnetworks that are not included within the deployed network topology, as operational changes within these other computing elements or subnetworks may indirectly affect the performance, stability, or scalability of the deployed topology.

As discussed above, the model generation engine 118 may be configured to determine network topology models for prospective deployed topologies (and/or modifications to existing deployed topologies) across multiple cloud infrastructures 104. When determining an initial formal/physical model for a network deployment, the model generation engine 118 may use a logical topology model 122 initially provided for the topology, one or more constraint inputs 124, and resource inventory data 126 for the cloud infrastructures 104. However, when determining modifications for logical topology models based on feedback (e.g., operational data 130) received from the existing deployed topologies, the model generation engine 118 may use not only the logical model, constraints, and resource inventories, but also may use the weighting factors 128.

Within the model generation engine 118, a formal model generator 206 may be configured to determine a modified formal topology model 212 (e.g., a physical network topology for the deployment network topology across multiple cloud infrastructures 104). The formal model generator 206 may determine the modified formal topology model 212 based on the logical topology input 122, the deployment constraint input 124, the resource inventories 126 for the cloud infrastructures 104, as well as based on the weighting factors 128.

Constraints 124 (also referred to as deployment constraints) may be predefined deployment conditions, specifications, or limitations that are provided by an administrator user and/or may be based on predefined policies of the network topology. Constraints may be associated with any node or groups of nodes within the deployed topology, or with the topology as a whole. Examples of constraints 124 may include requirements for specific nodes to be deployed on specific cloud infrastructures 104, requirements for groups of nodes to be deployed together on the same cloud infrastructures 104, requirements for minimum or maximum amounts of compute resources, storage resources, and/or network bandwidth to be provided to nodes or groups of nodes, etc. Additional examples of constraints 124 may include a specified number of virtual machine instances to be instantiated, specific types of software products or software configurations, and/or limits on pricing or cost or minimum amounts of storage, and the like. Still other examples of constraint inputs 124 may include but are not limited to placement of network functions within a cloud infrastructures 104, sensitivity level of data in a cloud infrastructure 104, capacity expectation of cloud infrastructure 104, and data traffic expectations.

Resource inventories 126 may define the available resources within each of the cloud infrastructures 104, thus determining the limits for prospective deployments across the cloud infrastructures 104 (e.g., multi-cloud deployments, hybrid network deployments, etc.). The particular data within resource inventories 126, and which components collect the resource inventories and provide the data to the topology deployment system 112 may vary in different embodiments. In some examples, a resource inventory may include data specifying which cloud infrastructures 104 are available, the specific resources that are available within each cloud infrastructure 104, such as the types of network devices and capabilities, the types of storage devices, the processing units, software services, and/or the types of virtual machine images that are available.

Constraints 124, weighting factors, and/or resource inventories 126 may be provided by a user or an administrator via a user device 116, or other components within the computing environment 200. Additionally, or alternatively, resource inventory and constraints may be obtained programmatically from files or configuration data that has been stored for other purposes in any of the elements of computing environment 200. For example, network management computers within cloud infrastructures 104 may store or expose computing element inventory data or constraints to API calls, parameterized URLs or other programmatic calls, and the topology deployment system 112 may be programmed to issue such calls to the cloud infrastructures 104 to obtain responses, objects or download files that contain inventory data 126 and/or constraints 124. As shown in this example, both constraints 124 and the resource inventory data 126 may be received and used as inputs to the model generation engine 118 to generate an optimized realization of the network services and other available resources. Constraints 124 and resource inventories 126 may change dynamically based on workload, system/software upgrades, and other factors that may change during the operation of the deployed network topology.

Further, the model generation engine 118 may utilize the weighting factors 128 to evaluate the formal topology model 212. In some instances, the weighting factors 128 may override decisions for modifying the network topology that would otherwise be made based on the deployment constraint data 124 and resource inventories 126. For instance, the deployment constraint data 124 and resource inventories 126 may indicate that a particular element 108 or grouping 110 is to be migrated 134 between infrastructures 104, but a weighting factor 128 may be strong enough to override that decision and prevent migration of that particular element 108 and/or grouping 110.

After generating one or more prospective modified network topologies, based on the weighting factors 128, as well as based on the logical topology model data 122, deployment constraint data 124, and resource inventories 126, the model generation engine 118 may validate and/or optimize the model using the model verification component 208, which also may verify the functional equivalency of the modified network topologies to the logical topology model 122. The validated modified network topology 212 then may be provided to the deployment generation engine 120, which may use an optimization component 214 and deployment generation component 212 to modify the physical network topology for deployed network topology, by transmitting sets of deployment instructions 216 from the deployment generation engine 120 to gateways within the different cloud infrastructures 104 to implement the determined updating of the network topology. In some embodiments, one or more cloud service adaptors may be used to generate specific configuration instructions 216 for the resources in the various cloud infrastructures 104 (e.g., private clouds, public clouds, and/or on-premise enterprise networks of which the topology deployment system 112 may be associated with). The cloud service adaptors may comprise executable code that causes generation of topologies specific to different technologies or services that are available only in specific different cloud infrastructures 104. Examples include NMS or AWS, where NMS and AWS are two different cloud service providers each providing at least a portion of a public cloud infrastructure in which a network topology may be deployed.

The specific configuration instructions generated by the cloud service adaptors may be provided as input to optimization component 214, which in some embodiments also may receive deployment constraint data 124 and weighting factors 128 as input. In such cases, the configuration instructions may be processed based on the constraint data 124 and weighting factors 128 to remap the network topology to an optimized version that attempts to fulfill as many constraints as possible that are represented in the constraint data 124 and weighting factors 128. The resulting topology may be verified for functional equivalence with the input logical topology model 122. In certain embodiments, model verification instructions may be programmed to implement partial order reduction techniques for verification.

The deployment instructions 216 may be executable by one or more devices in one or more of the cloud infrastructures 104 to result in one or more element migrations 134 between the cloud infrastructures 104 (and/or other modifications to the multi-cloud environment 102). In some examples, the deployment instructions 216 may comprise any type of modification that may be made internal to a single cloud infrastructure 104, and/or among multiple cloud infrastructures 104.

Figure 3:
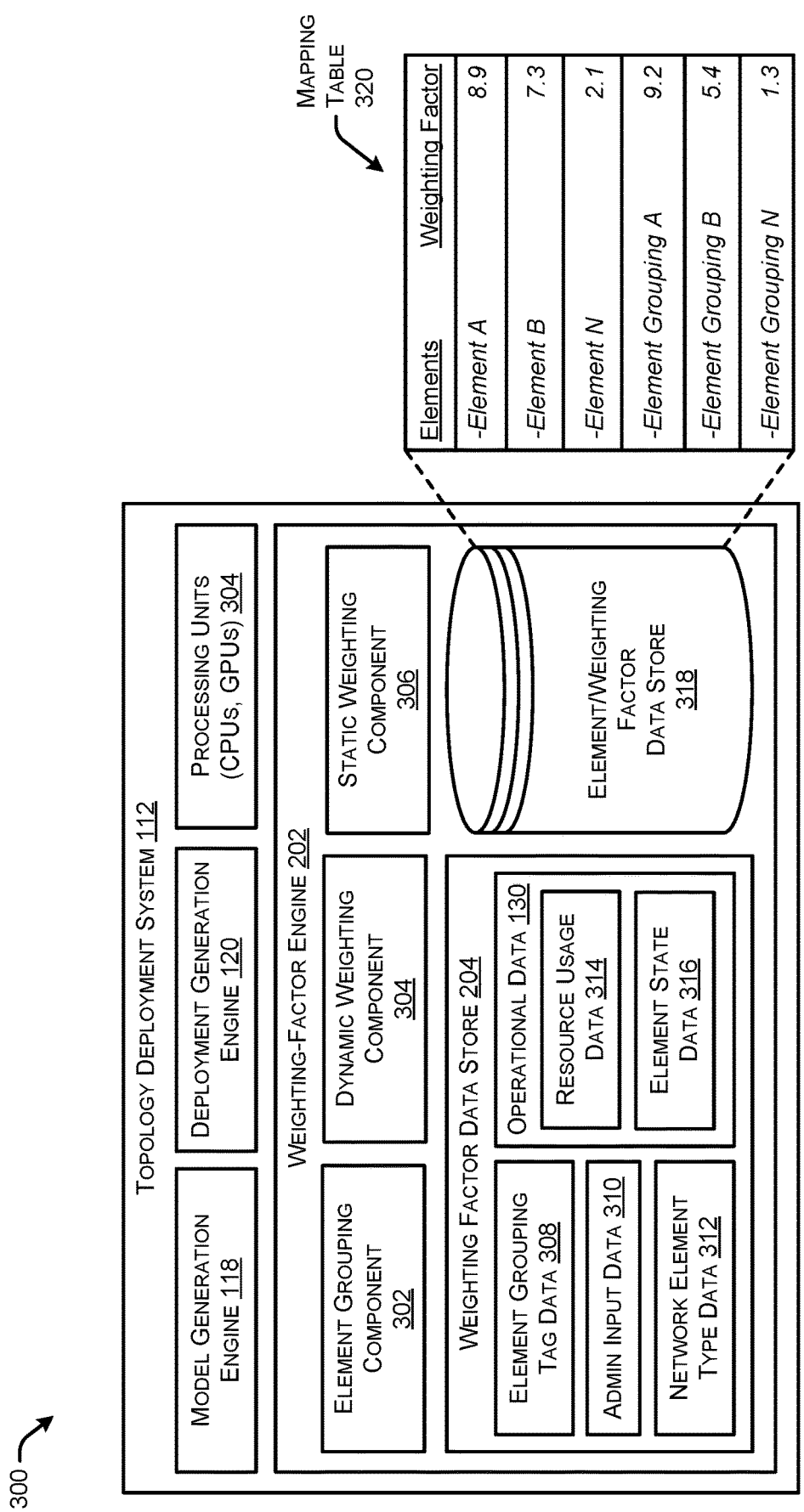
FIG. 3 illustrates a system diagram of an example weighting-factor engine configured to determine weighting factors for computing elements of a network topology that correspond to measures of resistivity of the computing elements from being modified and/or migrated in a multi-cloud environment.

FIG. 3 illustrates a system diagram of an example weighting-factor engine 202 configured to determine weighting factors 128 for computing elements 108 of a network topology that correspond to measures of resistivity of the computing elements 108 from being modified and/or migrated in a multi-cloud environment 102.

The topology deployment system 112 may include the weighting-factor engine 202 as well as the model generation engine 118 and deployment generation engine 120. Further, the topology deployment system 112 may comprise one or more processing units 304, which may include one or more central processing units (CPUs) and/or graphics processing units (GPUs). In some embodiments, GPUs may provide advantages over CPUs for the large-scale and intense number calculation operations that may be performed in machine-learning applications. Processing units 304 also may include tensor processing units (TPUs), which include artificial intelligence (AI) accelerator application-specific integrated circuits (ASICs) for supporting machine-learning applications.

The weighting-factor engine 202 may include an element grouping component 302 configured to group elements 108 into element groupings 110 based on the grouping 110 of elements 108 performing an overall function in conjunction with each other. For instance, the element grouping component 302 may determine an element grouping 110 as including a load balancer that is directing traffic flows to multiple compute elements 108. The element grouping component 302 may create the element groupings 110 using tagging data (e.g., metadata) and store element grouping tag data 308 in the weighting factor data store 204 to later identify the element groupings 110.

The weighting-factor engine 202 may include a dynamic weighting component 304 configured to determine dynamic weighting factors 128 for elements 108 and/or element groupings 110. The dynamic weighting component 304 may analyze various operations data 130 stored in the weighting factor data store 204, such as resource usage data 314, element state data 316, etc. As an example, the resource usage data 314 may indicate real time, or near real time, usage rates of computing resources by the elements 108 and/or element groupings 110. The dynamic weighting component 304 may determine weighting values 110 dynamically based on the resource usage data 314. As a specific example, if a computing element 108 is utilizing 90% of its CPU availability, then a relatively heavy weighting factor 128 may be assigned to the element 108 to restrict its movement in the multi-cloud environment 102. In another example, if the computing element 108 has high CPU utilization, this may be indicative that the computing element 108 is involved in activities that can be disruptive if migration occurs for that computing element 108. This high computing resource utilization by a computing element 108 may be indicative of error situations if that computing element 108 is migrated, further suggesting that a heavy weighting factor 128 may be assigned to the computing element 108 to restrict its movement. As another example, if a particular element grouping 110 is servicing a large amount of flows (e.g., above a threshold value that is "high" for the types of elements in the grouping), then the dynamic weighting component 304 may similarly assign a higher weighting factor 128 to the element grouping 110 to prevent or restrict modification or movement of the grouping 110 in the environment 102. Generally, the element state data 316 may represent a current state of the element 108 and/or element groupings 110, such as a build state. The element state data 316 may represent a build state, such as an amount of time and/or resources required to tear down and rebuild the corresponding element 108. The dynamic weighting component 304 may determine, based on the element state data 316, a difficulty associated with modifying and/or migrating a particular element 108 and/or grouping 110. Based on the state data 316, the dynamic weighting component 304 may assign higher or lower weighting factors 128 to the corresponding elements 108 and/or groupings 110. The weighting factors 128 may help prevent or restrict modification/migration of elements 108 and/or groupings 110 with element state data 316 indicating that a large time and/or resource expense would be involved in modifying/migrating the corresponding element 108 and/or grouping 110.

The weighting-factor engine 202 may further include a static weighting component 306 configured to determine static weighting factors 128 for elements 108 and/or groupings 110. The weighting-factor engine 202 may analyze admin input data 310 received from user device(s) 116 that indicate static weighting factors 128 for elements 108 and/or groupings 110. For instance, an admin may desire that a particular element 108 and/or grouping 110 never be migrated or modification due to, for example, privacy concerns and provide admin input data 310 indicating a static weighting factor 128 of a high value. As another example, the weighting-factor engine 202 may determine static weighting factors 128 for elements 108 and/or groupings 110 based on computing element type data 312. For instance, the computing element type data 312 may indicate mappings between types of elements 108 and predefined weighting factors 108 for those types of elements 108. For instance, a load balancer element 108 may have a higher weighting factor 128 than a container element 108 indicating that modifying the load balancer element 108 would cause a larger disruption than migrating a container element 108. Thus, the weighting factors 128 may be static weighting factors 128 based on element type.

The weighting-factor engine 202, and/or its subcomponents, may store mappings between elements 108 and/or groupings 110 in a data store 318 for use in determining updated formal topology models 212 after detecting changes in a network deployment. The mappings may correlate elements 108 and/or groupings 110 to respective dynamic and/or static weighting factors 128 in a mapping table 320. Although illustrated as numerical values between 0 and 10, the weighting factors 128 may generally be represented using any numerical format, textual format, etc., that can be used to convey an amount of disruption associated with migrating the particular computing element in the multi-cloud environment, and/or a measure of resistivity of the particular computing element 108 from being migrated in the multi-cloud environment 102.

The mapping table 320 may be analyzed by various components of the topology deployment system 112 in order to determine whether elements 108 and/or groupings 110 should be modified or migrated according to an updated formal topology model 212 as described herein.

Figure 4A:
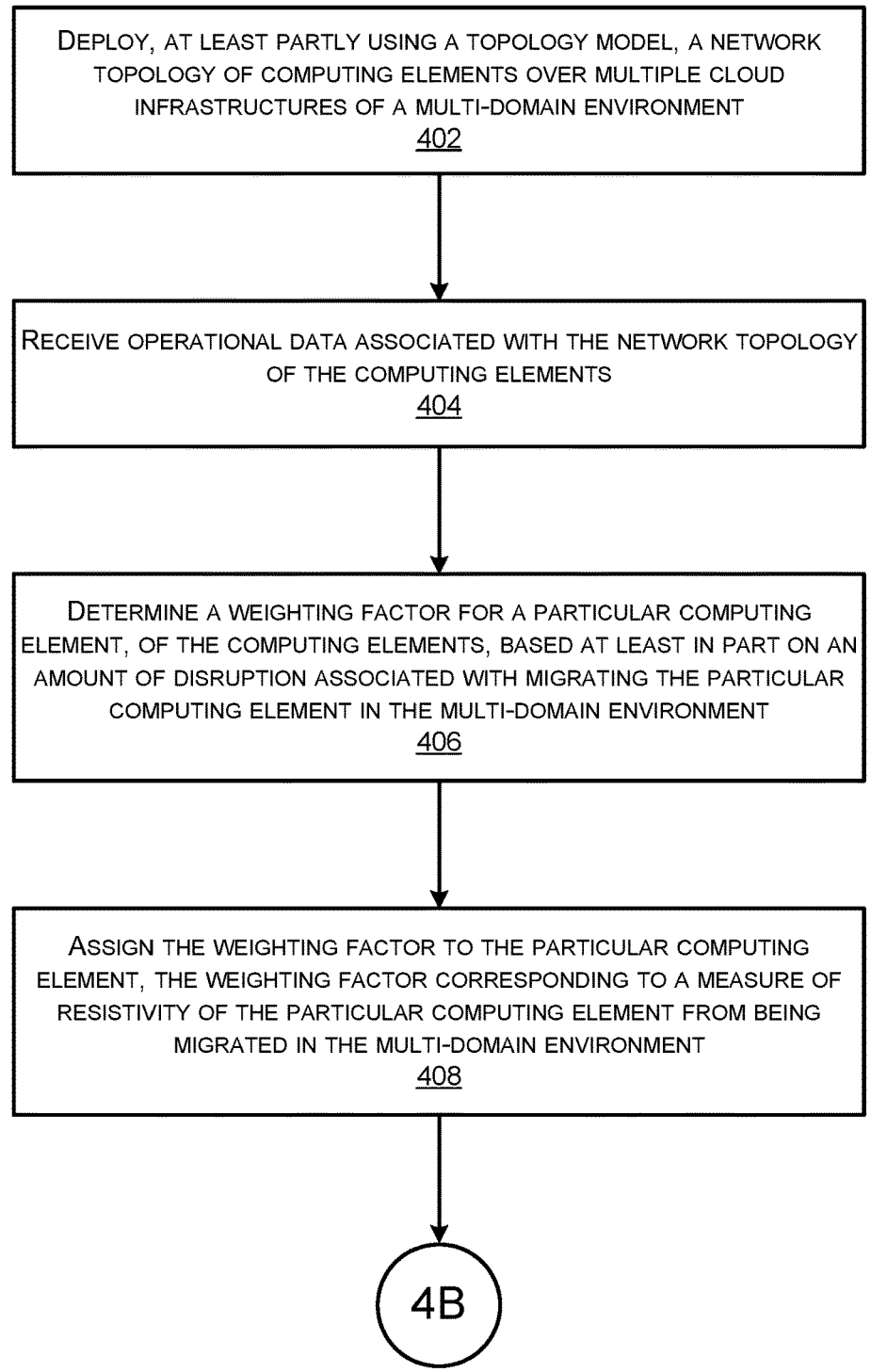
FIGS. 4A and 4B collectively illustrate a flow diagram of an example method for deploying network topologies, and modifying the network topologies at least partly using weighting factors that correspond to a measure of resistivity of computing elements from being modified.
Figure 4B:
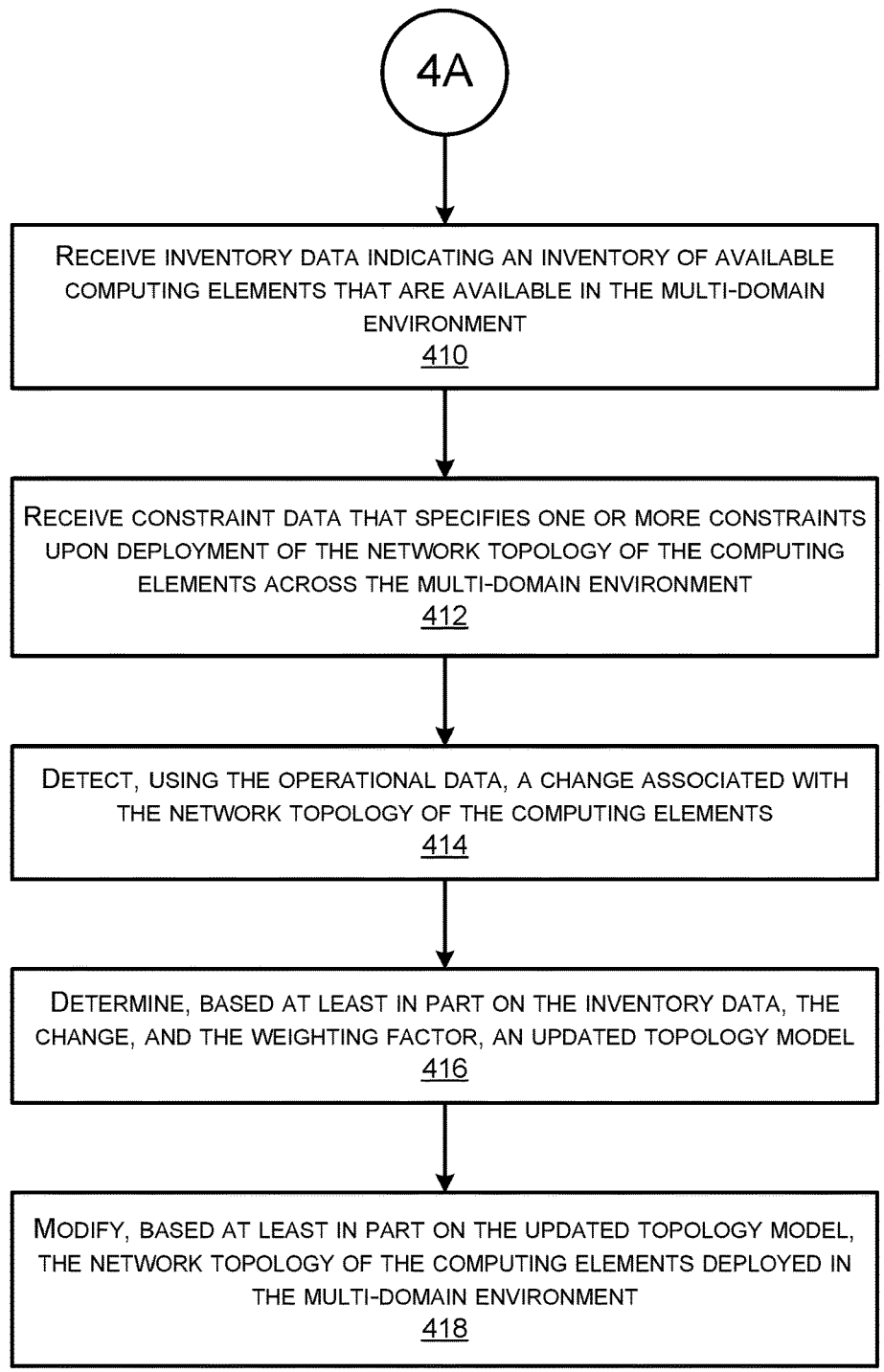

FIGS. 4A and 4B illustrate flow diagrams of an example method 400 which illustrate aspects of the functions performed at least partly by device(s) included in the topology deployment system 112 as described above in FIGS. 1-3. The logical operations described herein with respect to FIGS. 4A, and 4B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4A and 4B and described herein. These operations can also be performed in parallel, or in a different order than those described herein. Some or all of these operations also may be performed by components other than those specifically identified. Although the techniques described in this disclosure is with reference to specific components, in other examples, the techniques may be implemented by less components, more components, different components, or any configuration of components.

FIGS. 4A and 4B collectively illustrate a flow diagram of an example method 400 for deploying network topologies, and modifying the network topologies at least partly using weighting factors that correspond to a measure of resistivity of computing elements from being modified. In some examples, method 400 may be performed by a system comprising one or more processors and one or more non-transitory computer-readable media storing computer-executable instructions that, when executed by the one or more processors, cause the one or more processors to perform the steps of method 400. In some instances, the system may include the topology deployment system 112 described herein.

As noted above, techniques of this application have been described with reference to cloud infrastructures 104 in a multi-cloud environment 102. However, the techniques are applicable to any type of multi-domain environment, and cloud is simply an example used for illustrative purposes. Generally, the techniques are applicable to any "domain," or resource pool consisting of one or more of compute, network, storage, and/or any other computing resource or element. Domains need not be limited to cloud-based domains comprising data centers, but can be (for example) campus or company networks, IoT networks, enterprise networks, etc.

At 402, a topology deployment system 112 may deploy, at least partly using a topology deployment model 122, a network topology of computing elements 108 over multiple domain infrastructures 104 of a multi-domain environment 102.

At 404, the topology deployment system 112 may receive operational data 130 associated with a network topology of network elements 108. In some examples, the network elements 108 may be deployed across a multi-domain environment 102 at least partly using a topology model 122.

At 406, the topology deployment system 112 may determine a weighting factor 128 for a particular network element 108, of the network elements, based at least in part on an amount of disruption associated with migrating the particular network element 108 in the multi-domain environment 102. In some examples, determining the weighting factor 128 for the particular network element 108 comprises identifying a network element type (e.g., load balancer, server, virtual machine, container, etc.) associated with the particular network element, and identifying the weighting factor 128 as being associated with the network element type.

As another example, determining the weighting factor 128 for the particular network element 108 comprises determining a resource-utilization characteristic associated with the particular network element 108 that indicates usage of a computing resource by the particular network element, and calculating the weighting factor 128 based at least in part on the resource-utilization characteristic.

As an even further example, determining the weighting factor 128 for the particular network element 108 comprises determining that the particular network element 108 is included in a grouping of network elements 110, and calculating the amount of disruption associated with migrating the grouping 110 of network elements in the multi-domain environment 108.

At 408, the topology deployment system 112 may assign the weighting factor 128 to the particular network element 108, wherein the weighting factor 128 corresponds to a measure of resistivity of the particular network element 108 from being migrated in the multi-domain environment 102.

At 410, the topology deployment system 112 may receive inventory data 126 indicating an inventory of available network elements 108 that are available in the multi-domain environment 102.

At 412, the topology deployment system 112 may receive constraint data 124 that specifies one or more constraints upon deployment of the network topology of the network elements 108 across the multi-domain environment 102.

At 414, the topology deployment system 112 may detect, using the operational data 130, a change associated with the network topology of the network elements 108.

At 416, the topology deployment system 112 may determine, based at least in part on the inventory data 126, the change, the constraint data 124, and the weighting factor 128, an updated topology model 212.

In some examples, determining the updated topology model includes determining that the weighting factor overrides a constraint of the one or more constraints, and the method 400 further comprises refraining from migrating the particular network element 108 based at least in part on the weighting factor 128 overriding the constraint.

At 418, the topology deployment system 112 may modify, based at least in part on the updated topology model 212, the network topology of the network elements 108 deployed in the multi-domain environment 102.

In some instances, the method 400 further comprises determining, at a subsequent time, an updated weighting factor for the particular network element based at least in part on an updated amount of disruption associated with migrating the particular network element, and migrating the particular network element within the multi-domain environment based at least in part on the constraint overriding the updated weighting factor.

Further, the method 400 may further comprise determining that the updated topology model indicates a migration of the particular network element in the multi-domain environment, and refraining from migrating the particular network element based at least in part on the weighting factor.

Figure 5:
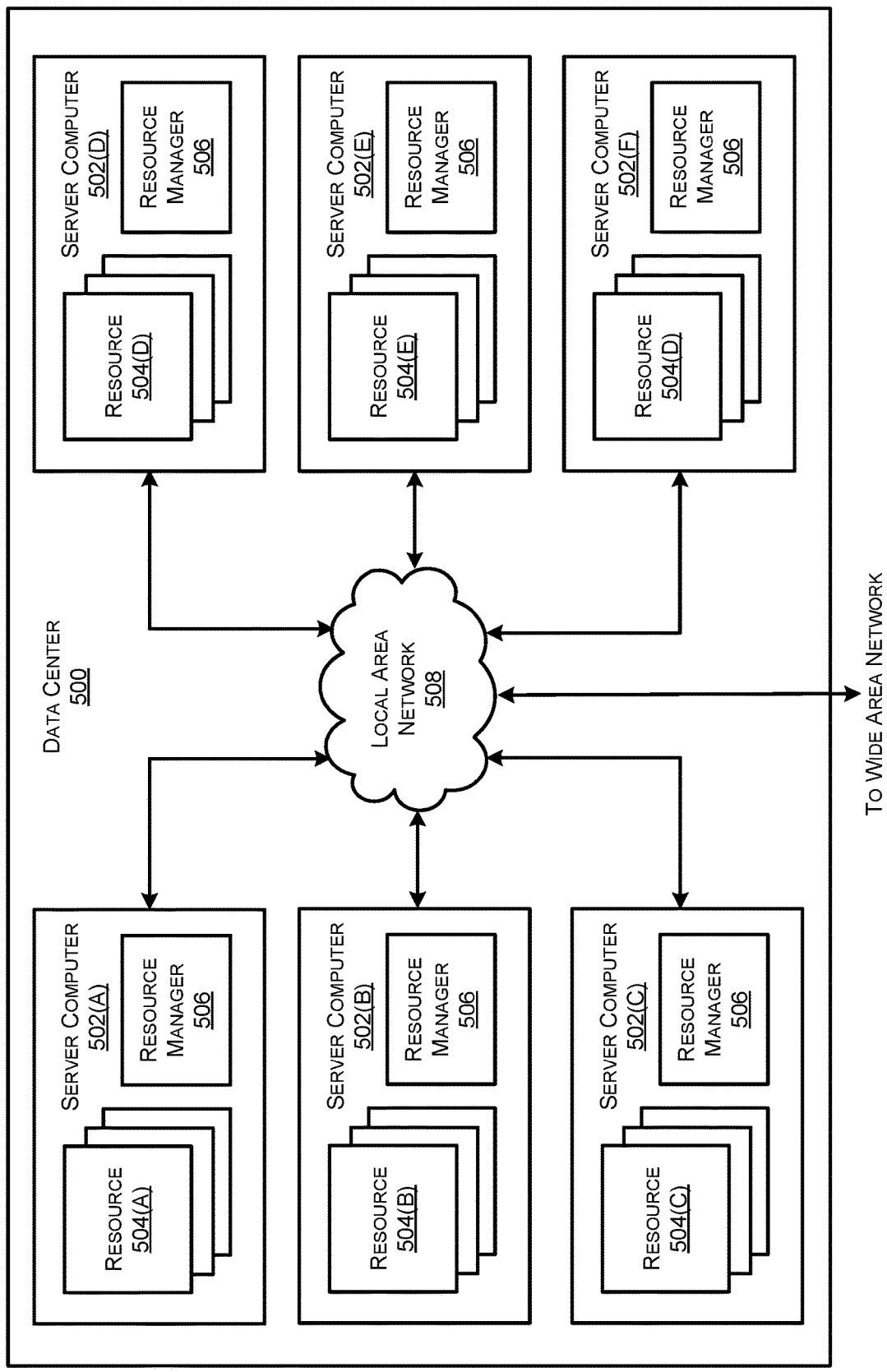
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, any of the network devices or elements described herein and/or devices included in the multi-domain environment 102 and/or topology deployment system 112. Although described as servers, the server computers 502 may comprise any type of networked device, such as servers, switches, routers, hubs, bridges, gateways, modems, repeaters, access points, etc.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances (and/or containers) on a single server computer 502. Server computers 502 in the data center 500 can also be configured to provide network services and other types of services.

In the example data center 500 shown in FIG. 5, an appropriate LAN 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized. In some examples, the server computers 502 may each execute one or more application containers and/or virtual machines to perform techniques described herein.

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations.

Figure 6:
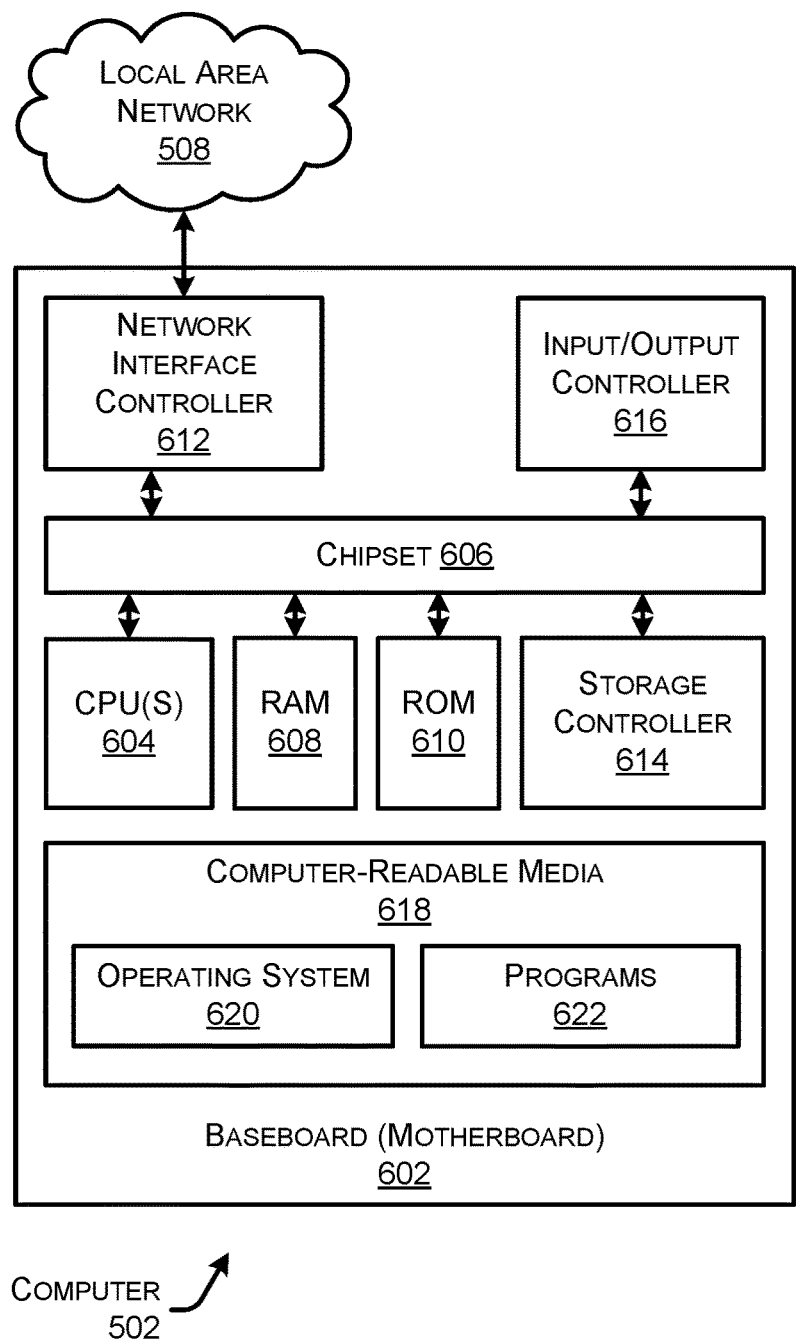
FIG. 6 is a computer architecture diagram showing an illustrative computer hardware architecture for implementing a server device that can be utilized to implement aspects of the various technologies presented herein.

FIG. 6 shows an example computer architecture for a server computer 502 capable of executing program components for implementing the functionality described above.

The computer architecture shown in FIG. 6 illustrates a conventional server computer, workstation, desktop computer, laptop, tablet, network appliance, e-reader, smartphone, or other computing device, and can be utilized to execute any of the software components presented herein. The server computer 502 may, in some examples, correspond to a physical server described herein, and may comprise networked devices such as servers, switches, routers, hubs, bridges, gateways, modems, repeaters, access points, etc.

The computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as the network 508. The chipset 606 can include functionality for providing network connectivity through a NIC 612, such as a gigabit Ethernet adapter. The NIC 612 is capable of connecting the computer 502 to other computing devices over the network 508. It should be appreciated that multiple NICs 612 can be present in the computer 502, connecting the computer to other types of networks and remote computer systems.

The computer 502 can be connected to and/or include a storage device 618 that provides non-volatile storage for the computer. The storage device 618 can store an operating system 620, programs 622, and data, which have been described in greater detail herein. The storage device 618 can be connected to the computer 502 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 502 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 618 by detecting the physical states or characteristics of one or more particular locations within the physical storage units.

In addition to the mass storage device 618 described above, the computer 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 502.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 502. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computer 502.

In one embodiment, the storage device 618 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regard to FIGS. 1-5. The computer 502 can also include computer-readable storage media having instructions stored thereupon for performing any of the other computer-implemented operations described herein.

The computer 502 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

As described herein, the computer 502 may comprise any of the network devices 106 described herein. The computer 502 may include one or more hardware processors 604 (processors) configured to execute one or more stored instructions. The processor(s) 604 may comprise one or more cores. Further, the computer 502 may include one or more network interfaces configured to provide communications between the computer 502 and other devices, such as the communications described herein as being performed by network devices and/or any systems. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure performed by network devices/elements. For instance, the programs 622 may cause the computer 502 to perform techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media storing computer-executable instructions that, when executed by the one or more processors, cause the one or more processors to perform operations comprising:

receiving operational data associated with a network topology of computing elements, the computing elements being deployed across a multi-domain environment, the computing elements of the network topology being deployed at least partly using a topology model;

determining a weighting factor for a particular computing element, of the computing elements, based at least in part on an amount of disruption associated with migrating the particular computing element in the multi-domain environment;

assigning the weighting factor to the particular computing element, the weighting factor corresponding to a measure of resistivity of the particular computing element from being migrated in the multi-domain environment;

receiving inventory data indicating an inventory of available computing elements that are available in the multi-domain environment;

detecting, using the operational data, a change associated with the network topology of the computing elements;

determining, based at least in part on the inventory data, the change, and the weighting factor, an updated topology model; and modifying, based at least in part on the updated topology model, the network topology of the computing elements deployed in the multi-domain environment.

2. The system of claim 1, the operations further comprising:

receiving constraint data that specifies one or more constraints upon deployment of the network topology of the computing elements across the multi-domain environment, wherein determining the updated topology model is further based at least in part on the constraint data.

3. The system of claim 2, wherein determining the updated topology model includes determining that the weighting factor overrides a constraint of the one or more constraints, the operations further comprising refraining from migrating the particular computing element based at least in part on the weighting factor overriding the constraint.

4. The system of claim 3, the operations further comprising:

determining, at a subsequent time, an updated weighting factor for the particular computing element based at least in part on an updated amount of disruption associated with migrating the particular computing element; and migrating the particular computing element within the multi-domain environment based at least in part on the constraint overriding the updated weighting factor.

5. The system of claim 1, wherein determining the weighting factor for the particular computing element comprises:

identifying a computing element type associated with the particular computing element; and identifying the weighting factor as being associated with the computing element type.

6. The system of claim 1, wherein determining the weighting factor for the particular computing element comprises:

receiving input from an administration account associated with the multi-domain environment indicating the weighting factor.

7. The system of claim 1, wherein determining the weighting factor for the particular computing element comprises:

determining a resource-utilization characteristic associated with the particular computing element, the resource-utilization characteristic indicating usage of a computing resource by the particular computing element; and calculating the weighting factor based at least in part on the resource-utilization characteristic.

8. The system of claim 1, wherein determining the weighting factor for the particular computing element comprises:

determining that the particular computing element is included in a grouping of computing elements; and calculating the amount of disruption associated with migrating the grouping of computing elements in the multi-domain environment.

9. The system of claim 1, the operations further comprising:

determining that the updated topology model indicates a migration of the particular computing element in the multi-domain environment; and refraining from migrating the particular computing element based at least in part on the weighting factor.

10. A method comprising:

receiving operational data associated with a network topology of computing elements, the computing elements being deployed across a multi-domain environment, the computing elements of the network topology being deployed at least partly using a topology model;

assigning a weighting factor to a particular computing element of the computing elements, the weighting factor corresponding to a measure of resistivity of the particular computing element from being migrated in the multi-domain environment;

receiving inventory data indicating an inventory of available computing elements that are available in the multi-domain environment;

detecting, using the operational data, a change associated with the network topology of the computing elements;

determining, based at least in part on the inventory data, the change, and the weighting factor, an updated topology model; and modifying, based at least in part on the updated topology model, the network topology of the computing elements deployed in the multi-domain environment.

11. The method of claim 10, further comprising determining the weighting factor for the particular computing element, of the computing elements, based at least in part on an amount of disruption associated with migrating the particular computing element in the multi-domain environment.

12. The method of claim 10, further comprising refraining from modifying the particular computing element in the multi-domain environment based at least in part on the weighting factor.

13. The method of claim 10, further comprising:

receiving constraint data that specifies one or more constraints upon deployment of the network topology of the computing elements across the multi-domain environment, wherein determining the updated topology model is further based at least in part on the constraint data.

14. The method of claim 13, further comprising determining that the weighting factor overrides a constraint of the one or more constraints, the operations further comprising refraining from migrating the particular computing element based at least in part on the weighting factor overriding the constraint.

15. The method of claim 13, further comprising:

determining, at a subsequent time, an updated weighting factor for the particular computing element based at least in part on an updated amount of disruption associated with migrating the particular computing element; and migrating the particular computing element within the multi-domain environment based at least in part on the one or more constraints overriding the updated weighting factor.

16. The method of claim 10, wherein determining the weighting factor for the particular computing element comprises:

determining a resource-utilization characteristic associated with the particular computing element, the resource-utilization characteristic indicating usage of a computing resource by the particular computing element; and calculating the weighting factor based at least in part on the resource-utilization characteristic.

17. The method of claim 10, the operations further comprising:

determining that the updated topology model is functionality equivalent to the topology model, wherein the updated topology model comprises deployment instructions that are capable of execution in the multi-domain environment to cause physical realization of a network deployment corresponding to the updated topology model; and in response to determining that the updated topology model is functionally equivalent to the topology model, transmitting the deployment instructions to the multi-domain environment.

18. One or more non-transitory computer-readable media storing processor-executable instructions that, when executed by one or more processors, cause the one or more processors to perform operations comprising:

receiving operational data associated with a network topology of computing elements, the computing elements being deployed across a multi-domain environment, the computing elements of the network topology being deployed at least partly using a topology model;

assigning a weighting factor to a particular computing element of the computing elements, the weighting factor corresponding to a measure of resistivity of the particular computing element from being migrated in the multi-domain environment;

receiving inventory data indicating an inventory of available computing elements that are available in the multi-domain environment;

detecting, using the operational data, a change associated with the network topology of the computing elements;

determining, based at least in part on the inventory data, the change, and the weighting factor, an updated topology model; and modifying, based at least in part on the updated topology model, the network topology of the computing elements deployed in the multi-domain environment.

19. The one or more non-transitory computer-readable media of claim 18, comprising further instructions that, when executed by the one or more processors cause the one or more processors to determine the weighting factor for the particular computing element, of the computing elements, based at least in part on an amount of disruption associated with migrating the particular computing element in the multi-domain environment.

20. The one or more non-transitory computer-readable media of claim 18, comprising further instructions that, when executed by the one or more processors cause the one or more processors to refrain from modifying the particular computing element in the multi-domain environment based at least in part on the weighting factor.

* * * * *